United States Patent
Jung

(10) Patent No.: US 7,965,698 B2
(45) Date of Patent: Jun. 21, 2011

(54) METHOD FOR PREVENTING UNNECESSARY RETRANSMISSION DUE TO DELAYED TRANSMISSION IN WIRELESS NETWORK AND COMMUNICATION DEVICE USING THE SAME

(75) Inventor: Jae-gyu Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 861 days.

(21) Appl. No.: 11/345,540

(22) Filed: Feb. 2, 2006

(65) Prior Publication Data

US 2006/0184664 A1    Aug. 17, 2006

(30) Foreign Application Priority Data

Feb. 16, 2005  (KR) ................. 10-2005-0012802

(51) Int. Cl.
*H04J 3/24* (2006.01)
(52) U.S. Cl. ............ 370/349; 455/422.1; 455/405; 455/418; 455/423; 455/428; 455/445; 370/229; 370/310.2; 370/338; 370/351; 370/352; 370/353; 370/354; 370/355; 370/356; 370/357
(58) Field of Classification Search ......... 455/422.1, 455/405, 418, 423, 428, 445; 370/229, 310, 370/310.2, 338, 349, 351–357
See application file for complete search history.

(56) References Cited

U.S. PATENT DOCUMENTS

| | | | | |
|---|---|---|---|---|
| 5,793,768 A | * | 8/1998 | Keshav | 370/400 |
| 5,974,028 A | * | 10/1999 | Ramakrishnan | 370/229 |
| 6,038,606 A | * | 3/2000 | Brooks et al. | 709/235 |
| 6,646,987 B1 | * | 11/2003 | Qaddoura | 370/231 |
| 6,700,871 B1 | * | 3/2004 | Harper et al. | 370/235 |
| 6,958,997 B1 | * | 10/2005 | Bolton | 370/392 |
| 6,961,309 B2 | * | 11/2005 | Carlson et al. | 370/235 |
| 2003/0117992 A1 | * | 6/2003 | Kim et al. | 370/349 |
| 2003/0131079 A1 | * | 7/2003 | Neale et al. | 709/220 |
| 2003/0135784 A1 | * | 7/2003 | Yamaguchi et al. | 714/18 |

FOREIGN PATENT DOCUMENTS

| | | | |
|---|---|---|---|
| EP | 1052797 | * | 11/2000 |
| EP | 1052797 A2 | | 11/2000 |
| JP | 2003-209576 A | | 7/2003 |
| KR | 2003-0087882 A | | 11/2003 |

OTHER PUBLICATIONS

A. Gurtov and R. Ludwig: Responding to Spurious Timeouts in TCP: INFOCOM 2003, 11pages.*
Augé, Anna C. et al., "Window Prediction Mechanism for Improving TCP in Wireless Asymmetric Links", IEEE GLOBECOM 1998, (Continued)

*Primary Examiner* — Stephen M D'Agosta
(74) *Attorney, Agent, or Firm* — Sughrue Mion, PLLC

(57) ABSTRACT

A method for reducing unnecessary retransmissions due to transmission delays in a wireless network environment, comprising: measuring a packet inter-arrival time with respect to a received data packet; transmitting an acknowledgement packet corresponding to the data packet received at the packet inter-arrival time in excess of a first threshold time when the measured packet inter-arrival time exceeds the first threshold time; and suspending transmission of an acknowledgement packet corresponding to a new data packet when a data packet received after having transmitted the acknowledgement packet is the new data packet that has not previously been received.

18 Claims, 11 Drawing Sheets

OTHER PUBLICATIONS

GLOBECOM '98, The Bridge to Global Integration, Sydney, Nov. 8-12, 1998, IEEE Global Telecommunications Conference, New York, NY : IEEE, US vol. 1, Nov. 8, 1998, pp. 533-538.

Andrei Gurtov and Reiner Ludwig, "Responding to Spurious Timeouts in TCP," IEEE INFOCOM 2003, 11 pages.

* cited by examiner

METHOD FOR PREVENTING UNNECESSARY RETRANSMISSION DUE TO DELAYED TRANSMISSION IN WIRELESS NETWORK AND COMMUNICATION DEVICE USING THE SAME

CROSS-REFERENCE TO RELATED APPLICATIONS

This application is based on and claims priority from Korean Patent Application No. 10-2005-0012802 filed on Feb. 16, 2005 in the Korean Intellectual Property Office, the disclosure of which is incorporated herein in its entirety by reference.

BACKGROUND OF THE INVENTION

1. Field of the Invention

Devices and methods consistent with the present invention relate to transmission control in a transmission control protocol (TCP). More particularly, the present invention relates to a method for preventing unnecessary retransmission caused due to delayed transmission in a wireless network environment, and a communication device using the same.

2. Description of the Related Art

The transmission control protocol (TCP) is used together with the Internet protocol (IP) for data transmission between communication devices. A main function of TCP is to stabilize the transmission of data through a network. For this, TCP uses a congestion control mechanism. The TCP congestion control mechanism controls the data packet transmission by observing network congestion while the data packets are being transmitted, and retransmits any data packet(s) lost due to network congestion. The TCP congestion control mechanism according to the conventional art will be described with reference to FIGS. 1 and 2.

FIG. 1 illustrates changes in the transmission rate according to the conventional slow-start/congestion avoidance algorithm.

The TCP of a communication device that transmits data packets (hereinafter referred to as a "transmitting device") adjusts the size of a congestion window (hereinafter abbreviated as "CWND"), and transmits one or more data packets simultaneously according to the size of CWND. As the CWND size increases, the number of data packets available for simultaneous transmission increases. The initial CWND size (CWND 1) is one TCP segment.

A communication device that receives a data packet (hereinafter referred to as a "receiving device") transmits an acknowledgement packet (ACK packet) to the transmitting device. The TCP of the transmitting device increases the CWND size by one TCP segment whenever it receives an acknowledgement packet transmitted by the receiving device. Accordingly, the CWND size increases exponentially, which is called a slow-start algorithm. Changes in the CWND size according to the slow-start algorithm are depicted in the slow-start period 110.

When the CWND size approaches the slow-start threshold (hereinafter abbreviated as "SSTHRESH"), that is, SSTHRESH 1 while the slow-start algorithm is in progress, the TCP of the transmitting device uses a congestion avoidance algorithm that linearly increases the CWND size considering the network congestion. In the congestion avoidance algorithm, the TCP increases the CWND size by 1/CWND whenever it receives an acknowledgement packet. Changes in the CWND size according to the congestion avoidance algorithm are depicted in the congestion avoidance period 120.

When no acknowledgement packet corresponding to the transmitted data packet is received, the TCP of the transmitting device waits until the acknowledgement packet is received, without increasing the CWND size. However, if no acknowledgement packet is received after a predetermined time period, the TCP generates a retransmission timeout 130. The time period from when the TCP transmits a data packet to when it generates a retransmission timeout is about two times the round trip time (RTT) of a packet.

Once the retransmission timeout is generated, the TCP decides that the transmitted data packet has been lost due to network congestion. Then, the TCP sets the CWND size to one TCP segment so that the amount of data to be transmitted is reduced. In addition, the TCP sets the slow-start threshold (SSTHRESH 2) to half the CWND size (CWND 2) immediately before the retransmission timeout is generated. According to the slow-start algorithm, the TCP resumes transmitting the lost data packets (the data packets whose acknowledgement packets have not been received).

FIG. 2 illustrates changes in transmission rate according to a congestion control algorithm which employs the conventional fast retransmission and fast recovery algorithm.

In the slow-start/congestion avoidance algorithm, loss of data packets in the course of transmission is decided based only on whether the retransmission timeout is generated. However in the fast retransmission algorithm, if a predetermined number of duplicate acknowledgement packets (duplicate ACKs) has been received even before the retransmission timeout is generated, it is decided that the data packets are lost.

A duplicate acknowledgement packet is generated by the TCP of the receiving device when data packets transmitted by the transmitting device and those received by the receiving device are different in sequence. The sequence of data packets can be ascertained through the sequence numbers set in the headers of the data packets.

When an acknowledgement packet to a specific data packet has not been received while the transmitting device is using to the slow-start/congestion avoidance algorithm, the TCP waits for the acknowledgement packet until a retransmission timeout is generated. When a predetermined number of duplicate response packets have been received before the retransmission timeout is generated, the TCP considers the data packets lost though no retransmission timeout has been generated. At this time, the TCP uses the fast retransmission algorithm to retransmit the data packets considered as having been lost. Changes in the transmission rate due to the fast retransmission algorithm are depicted in the fast retransmission period 220.

Usually the fast retransmission algorithm is applied when three duplicate acknowledgement packets have been received. When only one or two duplicate acknowledgement packets are received, it may be decided that the data packets have not arrived sequentially as transmitted by the transmitting device since they respectively suffered from delayed transmissions in the network while they were transmitted to the receiving device, rather than considering the data packets lost.

When the transmitting device uses the fast retransmission algorithm, the CWND size is set to a value $$\left(\frac{CWND3}{2} + 3\right)$$

that is half the CWND size (CWND 3) immediately before the duplicate acknowledgement packets are received plus three TCP segments.

In the fast recovery algorithm, when an acknowledgement packet to the retransmitted data packet according to the fast retransmission algorithm is received, the TCP allows the transmitting device to immediately use the congestion avoidance algorithm without having to use the low-start algorithm. For this, a SSTHRESH value and a CWND size are set to half the CWND size (CWND 3) immediately before the fast retransmission algorithm is applied. Changes in transmission rates according to the fast recovery algorithm are depicted in the fast recovery period 230.

When a retransmission timeout is generated under the condition that an acknowledgement packet to a specific data packet has not been received, the TCP employs the slow-start/congestion avoidance algorithm. When a predetermined number of duplicate acknowledgement packets have been received before a retransmission timeout is generated, and under the condition that an acknowledgement packet to a specific data packet has not been received, the TCP employs the fast retransmission and fast recovery algorithm.

In the wireless network, transmission of data packets may abruptly and temporarily be delayed due to a change in the wireless environment, which is called "delay spike." A delay spike may be caused through mobility of a communication device, retransmission of a link layer to compensate for loss generated due to fading of a communication device, and periodical searches of a channel to search for a mobile terminate call.

Once a delay spike is generated, the transmitting device may not receive an acknowledgement packet to a transmitted data packet until a retransmission timeout is generated. In this case, the transmitting device decides that the data packets that it transmitted have been lost, and retransmits the data packets. However, when a data packet is successfully received by the receiving device despite delayed transmission due to the delay spike, retransmission of the data packet by the transmitting device will result in wasting resources of a wireless link. This problem according to the conventional art will be specifically described with reference to FIG. 3.

FIG. 3 illustrates packet transmission between communication devices according to the conventional art. In this figure, "N" to "N+9" refers to the sequence numbers of data packets.

Referring to this figure, the receiving device that has received a data packet "N" transmits a response packet thereto, and the transmitting device consecutively transmits data packets "N+1" to "N+7." However, as illustrated, data packets "N+1" to "N+7" transmitted from the transmitting device suffer from delayed transmissions 310. Delayed data packets may be stored in a queue of a relay device that relays packets between the transmitting device and the receiving device.

Because of this delayed transmission, a retransmission timeout 320 is generated in the transmitting device before it receives acknowledgement packets in response to the transmitted data packets "N+1" to "N+7."

Because the retransmission timeout 320 has been generated, the transmitting device decides that the data packets "N+1" to "N+7" are lost and attempts retransmission thereof. At this time, because the retransmission timeout has been generated the TCP of the transmitting device sets the CWND size to 1 TCP segment, and thus, only the first data packet "N+1" is preferentially retransmitted.

When the transmission delay is released 330 within a predetermined time due to a change in the wireless environment, the data packets "N+1" to "N+7" are successfully transmitted to the receiving device and the receiving device transmits an acknowledgement packet to each data packet 340. Accordingly, the retransmission timeout 320 generated in the transmitting device becomes a spurious timeout due to the delay spike.

As the acknowledgement packets from the receiving device are received, the transmitting device adjusts the CWND size and transmits data packets following the data packet "N+1." When all of the data packets "N+1" to "N+7" are retransmitted, new data packets "N+8," "N+9" and so on are transmitted.

However, retransmission by the transmitting device of the transmitted data packets "N+1" to "N+7" will result in wasting resources of the wireless link since the data packets were merely delayed but were successfully transmitted to the receiving device. In other words, retransmission of the data packets "N+1" to "N+7" is the unnecessary retransmission.

At this time, the retransmitted data packets "N+1" to "N+7" are on standby in a queue of a relay device that relays packets between the transmitting device and the receiving device while data packets "N+1" to "N+7" is being transmitted, which were previously transmitted. For this reason, the retransmitted data packets may be a little delayed in transmission as depicted in FIG. 3.

The receiving device that received the retransmitted data packets "N+1" to "N+7" again receives the same data packets, and it generates duplicate acknowledgement packets 350. When more than a predetermined number of duplicate response packets are transmitted to the transmitting device, the transmitting device operates according to the fast retransmission algorithm as described with reference to FIG. 2, and the CWND size decreases accordingly. However, at this time the fast retransmission algorithm is operated because of the unnecessary retransmission, and thus, reduction of the CWND size results in unnecessarily reducing the data transmission rate, thereby greatly wasting the wireless link resources.

In this case, the transmitting device retransmits the already transmitted data packets in response to the duplicate response packets. This retransmission is referred to as a "spurious retransmission," and this spurious retransmission wastes the wireless link resources. In the illustrated example, the already transmitted packet, N+8, is retransmitted because of the duplicate acknowledgement packet to the data packet, N+7 360.

According to the conventional art, even though a data packet is successfully transmitted after the transmission thereof is delayed, the transmitting device decides that the data packet was lost, and thus, retransmits the concerned data packet. This retransmission causes the problem that wireless link resources are wasted. In addition, the retransmitted data packets cause the receiving device to generate duplicate response packets, thereby resulting in extra reduction of the transmission rate by the transmitting device (unnecessary fast retransmission). In addition, the wireless link resources are further wasted because of the spurious retransmission generated due to the duplicate response packets.

SUMMARY OF THE INVENTION

The present invention provides a method and device which may decrease unnecessary retransmission of data packets due to delayed transmission in the wireless network environment.

According to an aspect of the present invention, there is provided a method for reducing unnecessary retransmissions due to transmission delays in a wireless network environment, comprising: measuring a packet inter-arrival time with respect to a received data packet; transmitting an acknowledgement packet corresponding to the data packet received at the packet inter-arrival time in excess of a first threshold time when the measured packet inter-arrival time exceeds the first threshold time; and suspending transmission of an acknowledgement packet corresponding to a new data packet when a data packet received after having transmitted the acknowledgement packet is a new data packet that has not previously been received.

According to an aspect of the present invention, there is provided a communication device, comprising: an inter-arrival time measuring unit which measures a packet inter-arrival time of a received data packet; a calculation unit which calculates a first threshold time using the packet inter-arrival time measured by the inter-arrival time measuring unit; a determination unit to compare the packet inter-arrival time measured by the inter-arrival time measuring unit with the first threshold time calculated by the calculation unit; and a control unit which controls transmission of an acknowledgement packet corresponding to a data packet received at a packet inter-arrival time exceeding the first threshold time when the determination unit determines that the packet inter-arrival time exceeds the first threshold time, and suspends transmission of an acknowledgement packet corresponding to a new data packet when the new data packet received after having transmitted the acknowledgement packet has not been previously received.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

Figure 1:
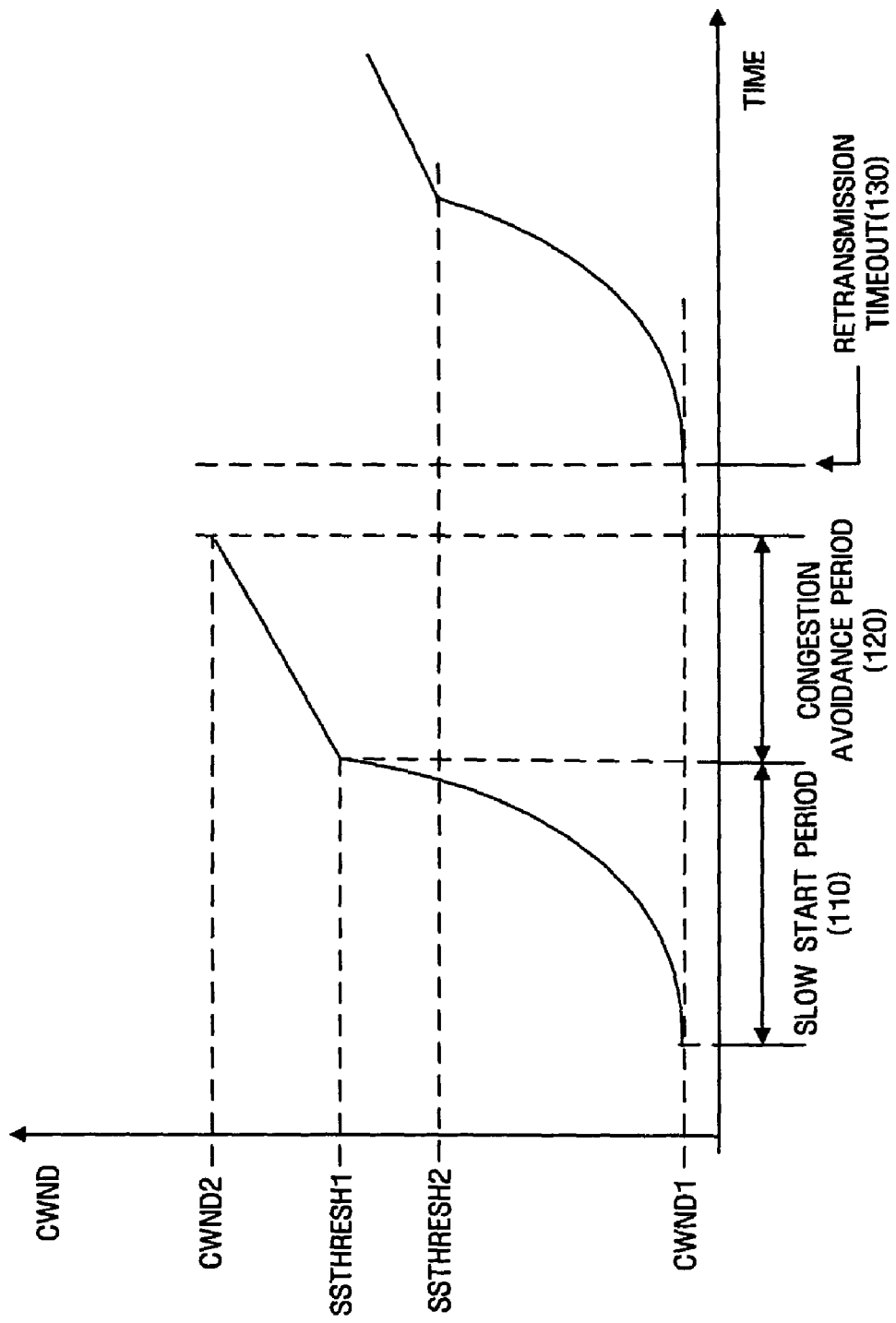
FIG. 1 illustrates changes in transmission rates according to the conventional slow-start/congestion avoidance algorithm.
Figure 2:
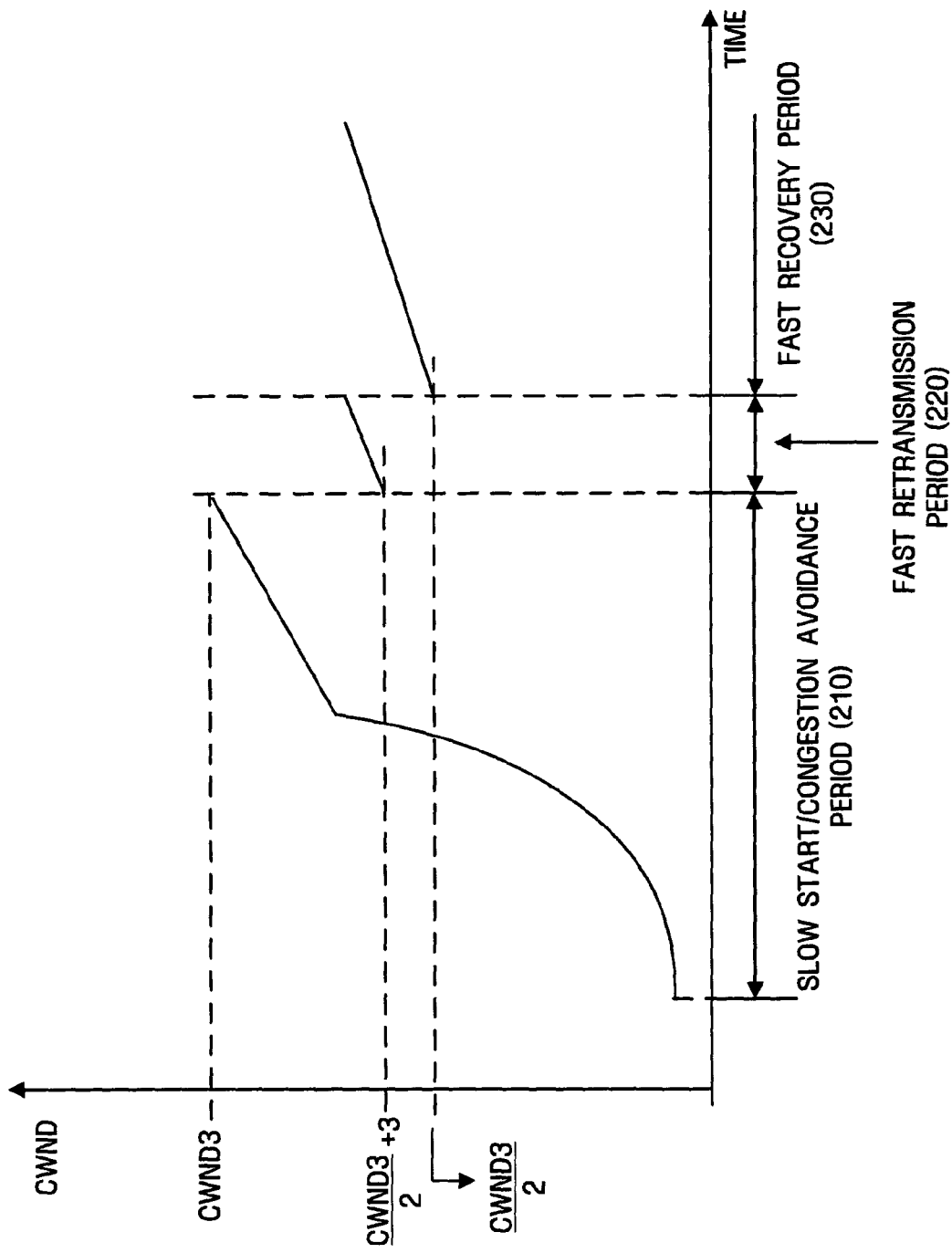
FIG. 2 illustrates changes in transmission rates according to the congestion control mechanism which applies the conventional fast retransmission and fast recovery algorithm.

Hereinafter, exemplary embodiments of the present invention will be described in detail with reference to the accompanying drawings. Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Exemplary embodiments of the present invention will be described in detail with reference to the accompanying drawings.

Figure 4:
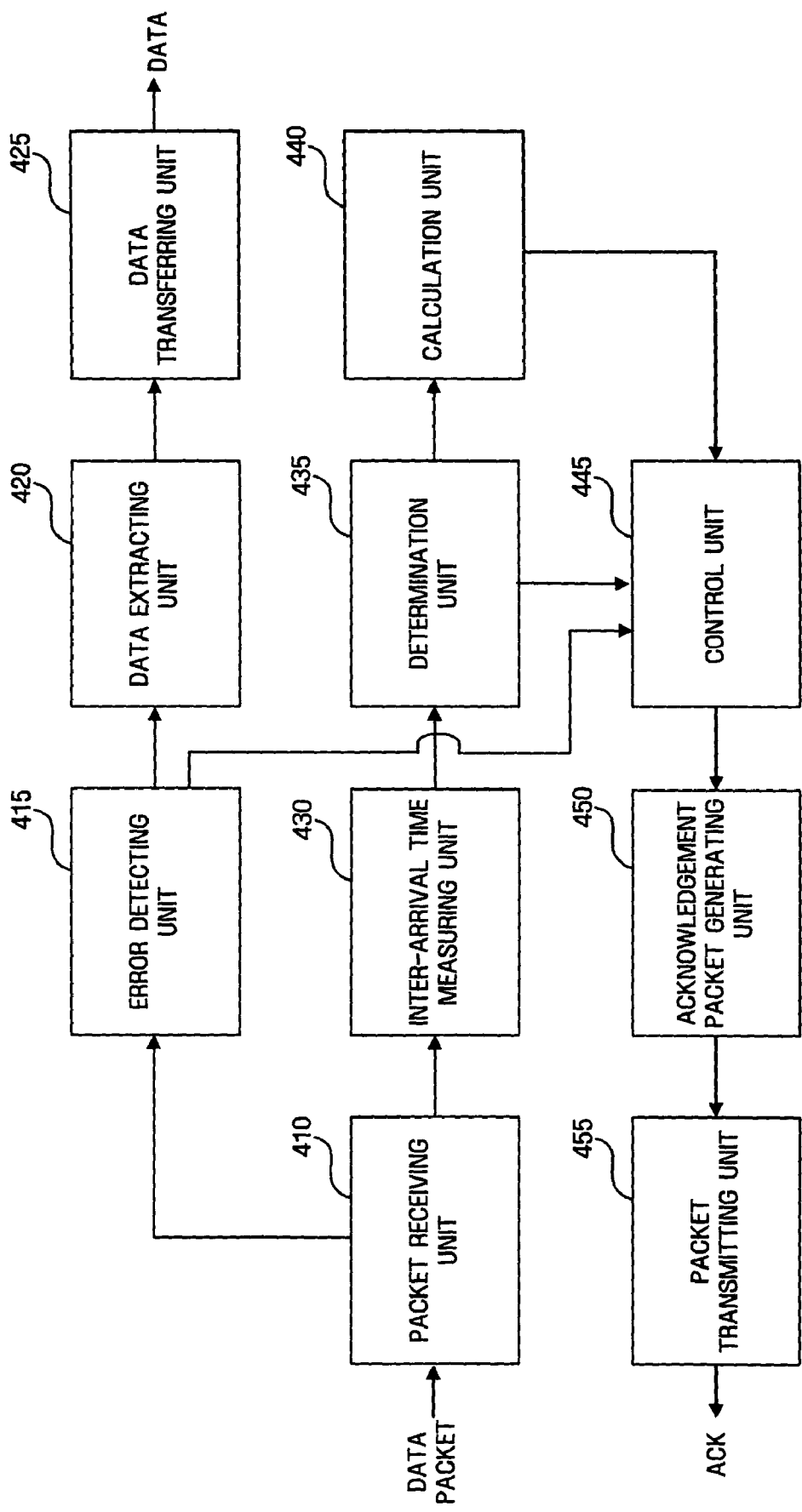
FIG. 4 is a block diagram illustrating a communication device according to an exemplary embodiment of the present invention.

FIG. 4 is a block diagram illustrating a communication device according to an exemplary embodiment of the present invention.

The communication device comprises a packet receiving unit 410, an error detecting unit 415, a data extracting unit 420 and a data transferring unit 425. The communication device further comprises an inter-arrival time measuring unit 430, a determination unit 435, a calculation unit 440, a control unit 445, a acknowledgement packet generating unit 450 and a packet transmitting unit 455.

The packet receiving unit 410 receives a data packet transmitted from another communication device through a wireless medium.

The error detecting unit 415 determines whether the data packet received by the packet receiving unit 410 has an error. This error determination may be made through a checksum field included in a TCP header of the data packet.

When there is no error in the received data packet, the data extracting unit 420 extracts data from the data packet, and the extracted data is transferred to an application through the data transferring unit 425.

The inter-arrival time measuring unit 430 measures the packet inter-arrival time. The packet inter-arrival time refers to the time interval between the arrival time of the previously received data packet and the arrival time of the currently received data packet. Accordingly, the inter-arrival time measuring unit 430 can measure a packet inter-arrival time whenever the packet receiving unit 410 receives a data packet.

The determination unit 435 compares the packet inter-arrival time measured by the inter-arrival time measuring unit 430 with a first threshold time. The first threshold time refers to a packet round-trip time of the transmitting device that can be estimated by the receiving device. When the packet inter-arrival time is in excess of the first threshold time, the determination unit 435 may determine that a transmission delay has been caused in the current wireless network. Preferably, the first threshold time is the upper limit value of a first time zone (to be described later).

When the packet inter-arrival time is less than the first threshold time, the determination unit 435 can determine whether the packet inter-arrival time measured by the inter-arrival time measuring unit 430 belongs to either the first time zone or a second time zone.

For example, when the packet inter-arrival time measured by the inter-arrival time measuring unit 430 is less than the upper limit value of the second time zone, the determination unit 435 may determine that the packet inter-arrival time falls under the second time zone. However, when the packet inter-arrival time is in excess of the upper limit value of the second time zone, the determination unit 435 may determine that the packet inter-arrival time falls under the first time zone.

Hereinafter, the first time zone and the second time zone will be described.

As described above with reference to the conventional art, the TCP determines a data transmission rate by adjusting the CWND size, and accordingly, the transmitting device can transmit a series of data packets at the same time. The second time zone refers to the time period within which packet inter-arrival times measured with respect to the received data packets can be distributed, when a series of data packets simultaneously transmitted by the transmitting device are received by the packet receiving unit 410. The receiving device can determine that data packets received at the packet inter-arrival times falling under the second time zone have been transmitted at the same time by the transmitting device.

Once an acknowledgement packet is received, the TCP of the transmitting device increases the CWND size so as to raise the transmission rate. Here, the time interval between the time when the transmitting device transmits a series of data packets according to the CWND size and the time when it transmits a next series of data packets according to the newly set CWND size after having received acknowledgement packets from the receiving device has a value approximately equal to the packet round-trip time. To interpret this in terms of the receiving device, the time interval between the time when the receiving device receives the last data packet among the series of data packets received at the packet inter-arrival time falling under the second time zone, and the time when it receives the first data packet among the next series of data packets received at the packet inter-arrival time falling under the second time zone after having transmitted the acknowledgement packets has a value approximately equal to the packet round-trip time. The first time zone refers to a time period within which the packet inter-arrival times that can be estimated as the packet round-trip time of the transmitting device are distributed. That is, it may be understood that the first time zone is a period of time within which times from when the receiving device transmits an acknowledgement packet to when the receiving device receives a data packet newly transmitted by the transmitting device that received the acknowledgement packet can be distributed. Accordingly, when the packet inter-arrival time exceeds the upper limit value (first threshold time) of the first time zone, it is determined that a delay in transmission has been generated in the wireless network.

The packet inter-arrival times that can be included in the first time zone and the second time zone will be described, by way of example, with respect to the first to third data packets transmitted by the transmitting device.

The transmitting device sets a first CWND size to 1 TCP segment when it transmits a data packet, and accordingly, one data packet can be transmitted. Upon receiving an acknowledgement packet corresponding to the first data packet from the receiving device after having transmitted the first data packet, the transmitting device increases the CWND size to two times, and accordingly, the transmitting device can transmit two data packets at the same time; that is, the second data packet and the third data packet are transmitted at the same time.

Once a data packet transmitted by the transmitting device is received, the inter-arrival time measuring unit 430 of the receiving device determines a packet inter-arrival time. The packet inter-arrival time measured relative to the second data packet (the time interval between arrival of the first data packet and arrival of the second data packet) is within the first time zone. The packet inter-arrival time measured relative to the third data packet (the time interval between arrival of the second data packet and arrival of the third data packet) is within the second time zone.

The calculation unit 440 calculates the upper limit value of the first time zone and that of the second time zone. As a result of a determination by the determination unit 435, when the packet inter-arrival time is within the first time zone, the calculation unit 440 newly calculates the upper limit value of the first time zone. As a result of a determination by the determination unit 435, when the packet inter-arrival time is within the second time zone, the calculation unit 440 newly calculates the upper limit value of the second time zone. Accordingly, the first time zone and the second time zone can be set by the calculation unit 440.

According to an exemplary embodiment of the present invention, the first time zone can be calculated through Equation 1 as follows.

$$\text{First time zone} = (T_S + V_S, T_L + V_L) \qquad \text{[Equation 1]}$$

In this equation, "$T_L$" refers to the mean value of packet inter-arrival times of the first time zone, "$V_L$" to the deviation of the mean value, "$T_L$". "$T_S + V_S$" refers to the upper limit value of the second time zone (to be described later).

According to an exemplary embodiment of the present invention, the mean value, "$T_L$" can be calculated through Equation 2 as follows.

$$T_L = a^* T_{L-1} + b^* t_L \qquad \text{[Equation 2]}$$

In this equation, "$T_{L-1}$" refers to the previously calculated mean value of packet inter-arrival times included in the first time zone, "$t_L$" refers to a concerned packet inter-arrival time when the packet inter-arrival time measured relative to the currently received data packet is included in the first time zone. In addition, "a" refers to the weight of "$T_{L-1}$" and "b" refers to the weight of "$t_L$", and "a" and "b" follow the relation: a+b=1. It is preferable that the weight "a" be larger value than the weight "b." Through this equation, rapid changes of the mean value "$T_L$" due to the newly measured packet inter-arrival time can be prevented, thereby obtaining a stable mean value.

In Equation 2, the initial value of the mean value "$T_L$" may be set to the packet inter-arrival time measured relative to the second data packet received by the packet receiving unit 410, among the data packets transmitted from the transmitting device.

According to an exemplary embodiment of the present invention, the deviation "$V_L$" of the mean value "$T_L$" can be calculated through Equation 3 as follows.

$$V_L = c^* V_{L-1} + d^* |V_{L-1} - T_L| \qquad \text{[Equation 3]}$$

In this Equation 3, "$V_{L-1}$" refers to a deviation calculated prior to obtaining the deviation "$V_L$", and "$T_L$" is a mean value calculated through Equation 2.

In addition, "c" refers to the weight of "$V_{L-1}$" and "d" to the weight of "$T_L$," and "c" and "d" follow the relation: c+d=1. It is preferable that the weight "c" be larger than the weight "d." Through this equation, rapid changes of the deviation due to the mean value can be prevented, thereby obtaining a stable variation.

The initial value of the deviation "$V_L$" may be set to a real number times the initial value of the mean value "$T_L$", and it is preferable for this real number to be between 0 and 1; more preferably, the real number may be 0.1. However, this is merely for illustrative purposes, and the initial value of the deviation "$V_L$" may vary according to the wireless network environment.

The calculation unit 440 may set the initial value of the upper limit value of the first time zone using the initial value of the mean value $T_L$ and the initial value of the variation "$V_L$." Accordingly, when the determination unit 435 determines that the packet inter-arrival time measured relative to the newly received data packet is included in the first time zone, the calculation unit 440 newly sets the first time zone, reflecting the packet inter-arrival time "$t_L$" measured relative to the newly received data packet.

According to an exemplary embodiment of the present invention, the second time zone can be calculated through Equation 4 as follows.

$$\text{Second time zone} = (0, T_S + V_S) \quad \text{[Equation 4]}$$

In Equation 4, "$T_S$" refers to the mean value of packet inter-arrival times included in the second time zone, and "$V_S$" refers to the deviation of the mean value "$T_S$." The mean value "$T_S$" can be calculated through Equation 5 as follows.

$$T_S = e^* T_{S-1} + f^* t_S \quad \text{[Equation 5]}$$

In Equation 5, "$T_{S-1}$" refers to the previously calculated mean value of packet inter-arrival times included in the second time zone, "$t_S$" refers to a concerned packet inter-arrival time when the packet inter-arrival time measured relative to the currently received data packet is included in the second time zone.

In addition, "e" refers to the weight of "$T_{S-1}$" and "f" refers to the weight of "$t_S$," and "e" and "f" follow the relation: "e+f=1." It is preferable that the weight "e" be larger than the weight "f." Through this equation, rapid changes of the mean value "$T_S$" due to the newly measured packet inter-arrival time can be prevented, thereby obtaining a stable mean value.

In Equation 5, the initial value of the mean value "$T_S$" may be set to the packet inter-arrival time measured relative to the third data packet received by the packet receiving unit 410, among the data packets transmitted from the transmitting device.

According to an exemplary embodiment of the present invention, the deviation "$V_S$" of the mean value "$T_S$" can be calculated through Equation 6:

$$V_S = g^* V_{S-1} + h^* |V_{S-1} - T_S| \quad \text{[Equation 6]}$$

In this equation, "$V_{S-1}$" refers to the deviation calculated prior to calculating the deviation "$V_S$", and "$T_S$" is the mean value calculated through Equation 5.

In addition, "g" refers to the weight of "$V_{S-1}$" and "h" refers to the weight of "$T_S$," both of which follow the relation: "g+h=1." It is preferable that the weight "g" has a larger value than the weight "h." Through this equation, rapid changes of the variation due to the mean value can be prevented, thereby obtaining a stable variation.

The initial value of the variation "$V_S$" may be set to a real number times the initial value of the mean value "$T_S$", and it is preferable that the real number be between 0 and 1; more preferably, the real number may be 0.1. However, this is merely for illustrative purposes, and the initial value of the variation "$V_S$" may vary according to the wireless network environment.

The calculation unit 440 may set to an initial value of the second time zone using the initial value of the mean value "$T_S$" and the initial value of the deviation "$V_S$." Accordingly, when the determination unit 435 determines that the packet inter-arrival time measured relative to the newly received data packet is included in the second time zone, the calculation unit 440 newly sets the second time zone, reflecting the packet inter-arrival time $t_S$ measured relative to the newly received data packet.

The control unit 445 controls the acknowledgement packet generating unit 450 and the packet transmitting unit 455 so as to transmit an acknowledgement packet corresponding to the data packet, which is free of errors according to an assessment by the error detecting unit 415. The determination unit 435 may determine that a transmission delay has been generated in the current wireless network when the packet inter-arrival time exceeds the first threshold time. If so, the control unit 445 determines whether it is necessary to transmit an acknowledgement packet corresponding to the data packet subsequently received. The process of determining whether to transmit an acknowledgement packet will be described in detail with reference to FIGS. 5 to 11.

The acknowledgement packet generating unit 450 generates an acknowledgement packet corresponding to the data packet received by the packet receiving unit 410, according to control by the control unit 445.

The packet transmitting unit 455 wirelessly transmits the acknowledgement packet generated by the acknowledgement packet generating unit 450. In the illustrated example, the packet receiving unit 410 and the packet transmitting unit 455 are present as separate modules, but this is merely for illustrative purposes. According to another exemplary embodiment, the packet receiving unit 410 and the packet transmitting unit 455 may be constructed in a single integrated module.

Hereinafter, a process of operating a communication device according to an exemplary embodiment of the present invention will be described in more detail with reference to FIGS. 5 to 11. For this, it is assumed that no error has been detected in the received data packet.

Figure 5:
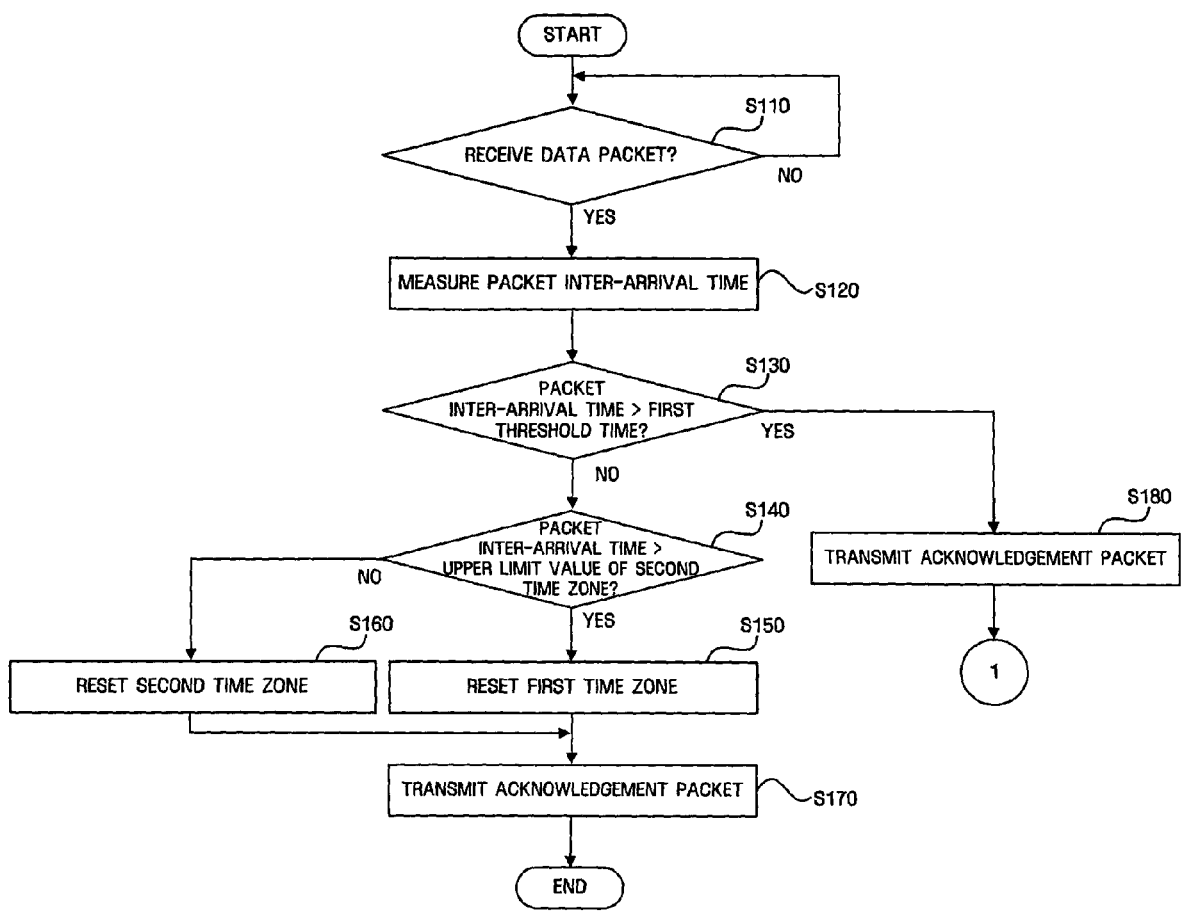
FIG. 5 is a flow chart illustrating a process of operating a communication device according to an exemplary embodiment of the present invention.

FIG. 5 is a flow chart illustrating a process of operating the communication device according to an exemplary embodiment of the present invention.

When the packet receiving unit 410 receives a data packet (S110), the inter-arrival time measuring unit 430 measures the packet inter-arrival time of the received data packet (S120).

Thereafter, the determination unit 435 compares the packet inter-arrival time measured by the inter-arrival time measuring unit 430 with the first threshold time (S130). The first threshold time is preferably the upper limit value of the first time zone.

As a result of comparison, when the packet inter-arrival time is equal to the first threshold time or less than the first threshold time, the determination unit 435 compares the packet inter-arrival time with the upper limit value of the second time zone (S140). When the packet inter-arrival time is in excess of the upper limit value of the second time zone, the determination unit 435 determines that the packet inter-arrival time is included in the first time zone. At this time, the calculation unit 440 resets the first time zone, reflecting the packet inter-arrival time measured in operation S120 (S150). More specifically, the calculation unit 440 calculates the upper limit value of a new first time zone; for this calculation, Equations 1 to 3 may be used.

As a result of the comparison in operation S140, when the packet inter-arrival time is equal to the upper limit value of the second time zone or less than the upper limit value of the second time zone, the determination unit 435 determines that the packet inter-arrival time is included in the second time zone. At this time, the calculation unit 440 resets the second time zone, reflecting the packet inter-arrival time measured in operation S120 (S160). More specifically, the calculation unit 440 may use Equations 4 to 6 to calculate the upper limit value of a new second time zone.

The control unit 445 controls transmission of an acknowledgement packet corresponding to the received data packet (S170). At this time, the acknowledgement packet generating unit 450 generates an acknowledgement packet corresponding to the received data packet and the packet transmitting unit 455 transmits the generated acknowledgement packet, according to control by the control unit 445.

Operations S110 to S170 may be repeated until transmission of the data packets from the transmitting device is completed, as long as the packet inter-arrival time does not exceed the first threshold time.

A comparison is performed in operation S130 and if the result shows that the packet inter-arrival time exceeds the first threshold time, the control unit 445 controls transmission of an acknowledgement packet corresponding to the received data packet (S180). At this time, the acknowledgement packet generating unit 450 generates an acknowledgement packet corresponding to the received data packet and the packet transmitting unit 455 transmits the generated acknowledgement packet, according to control by the control unit 445.

When the packet inter-arrival time exceeds the first threshold time, it can be determined that a transmission delay has been generated in the wireless network. Accordingly, after having transmitted an acknowledgement packet corresponding to the received data packet at a packet inter-arrival time in excess of the first threshold time (S180), the control unit 445 limits transmission of acknowledgement packets according to predetermined conditions in order to reduce unnecessary retransmission by the transmitting device. The processes after operation S180 will be described with reference to FIGS. 6 and 7.

Figure 6:
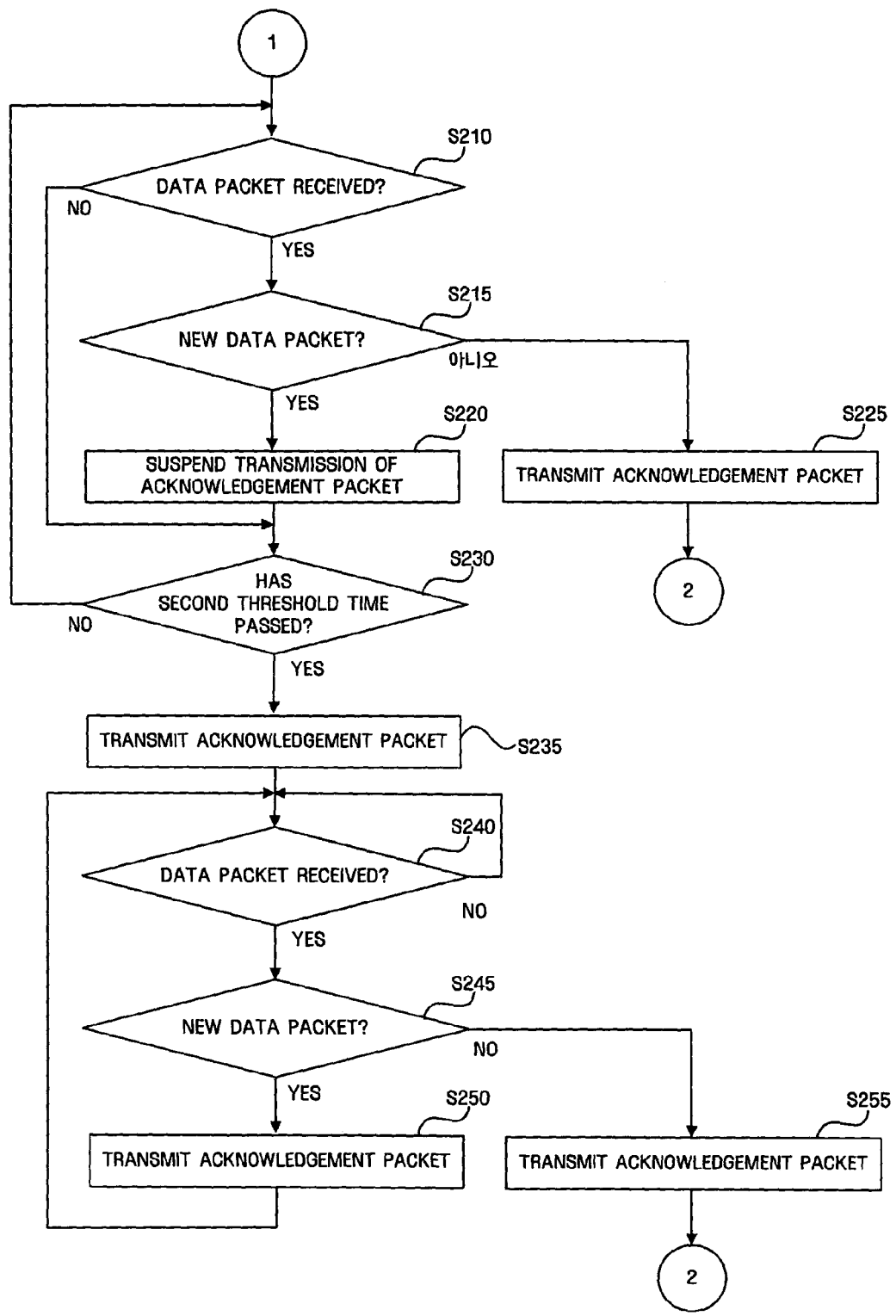
FIG. 6 is a flow chart illustrating a method of preventing unnecessary retransmission in a wireless network environment according to an exemplary embodiment of the present invention.

FIG. 6 is a flow chart illustrating a method of preventing unnecessary retransmission in the wireless network environment according to an exemplary embodiment of the present invention.

After having transmitted an acknowledgement packet corresponding to the data packet received at a packet inter-arrival time in excess of the first threshold time (S180), when a data packet is received by the packet receiving unit (S210), the control unit 445 determines whether the received data packet is a previously received data packet (hereinafter referred to as "a new data packet") (S215). When the received data packet is a new data packet, the control unit 445 suspends transmission of an acknowledgement packet corresponding to the received data packet (S220). Accordingly, the acknowledgement packet generating unit 450 may not generate an acknowledgement packet corresponding to the new data packet.

The control unit 445 also determines whether the second threshold time has passed after having transmitted an acknowledgement packet in operation S180 (S230). The second threshold time is a packet round-trip time estimated by the receiving device. Desirably, the second threshold time has the same value as the first threshold time. When the second threshold time has not passed since the acknowledgement packet was transmitted in operation S180, the control unit 445 suspends transmission of the acknowledgement packet corresponding to the new data packet although the new data packet has been consecutively received.

When the data packet received before the second threshold time has passed since the response packet was transmitted in operation S180, which refers to a previously received data packet (hereinafter referred to as "a duplicate data packet"), the control unit 445 controls transmission of an acknowledgement packet corresponding to the data packet having the highest sequence number, among the data packets received after having transmitted the acknowledgement packet in operation S180 (S225). At this time, the acknowledgement packet generating unit 450 generates an acknowledgement packet corresponding to the data packet according to control of the control unit 445, and the packet transmitting unit 455 transmits the generated acknowledgement packet. The processes following the acknowledgement packet transmission in operation S225 will be described with reference to FIG. 7.

In the meantime, when the second threshold time has passed under the condition that no duplicate data packet was received after the acknowledgement packet was transmitted in operation S180, as a result of the determination in operation S230, the control unit 445 controls transmission of an acknowledgement packet corresponding to the data packet having the highest sequence number, among the data packets received before the second threshold time has passed (S235). Accordingly, the acknowledgement packet generating unit 450 generates an acknowledgement packet corresponding to the data packet according to control of the control unit 445, and the packet transmitting unit 455 transmits the generated acknowledgement packet. At this time, the transmitted acknowledgement packet serves to prevent generation of a retransmission timeout by the transmitting device.

Then, when the packet receiving unit 410 receives a data packet (S240), the control unit 445 determines whether the received data packet is a new data packet (S245). When a new data packet has been received, the control unit 445 controls transmission of an acknowledgement packet corresponding to the received data packet (S250).

As a result of determination in step S245, when the received data packet is a duplicate data packet, the control unit 445 controls transmission of an acknowledgement packet corresponding to the duplicate data packet (a duplicate acknowledgement packet) (S255). Processes after transmission of the acknowledgement packet in operation S225 or transmission of the duplicate acknowledgement packet in operation S255 will be described with reference to FIG. 7.

Figure 7:
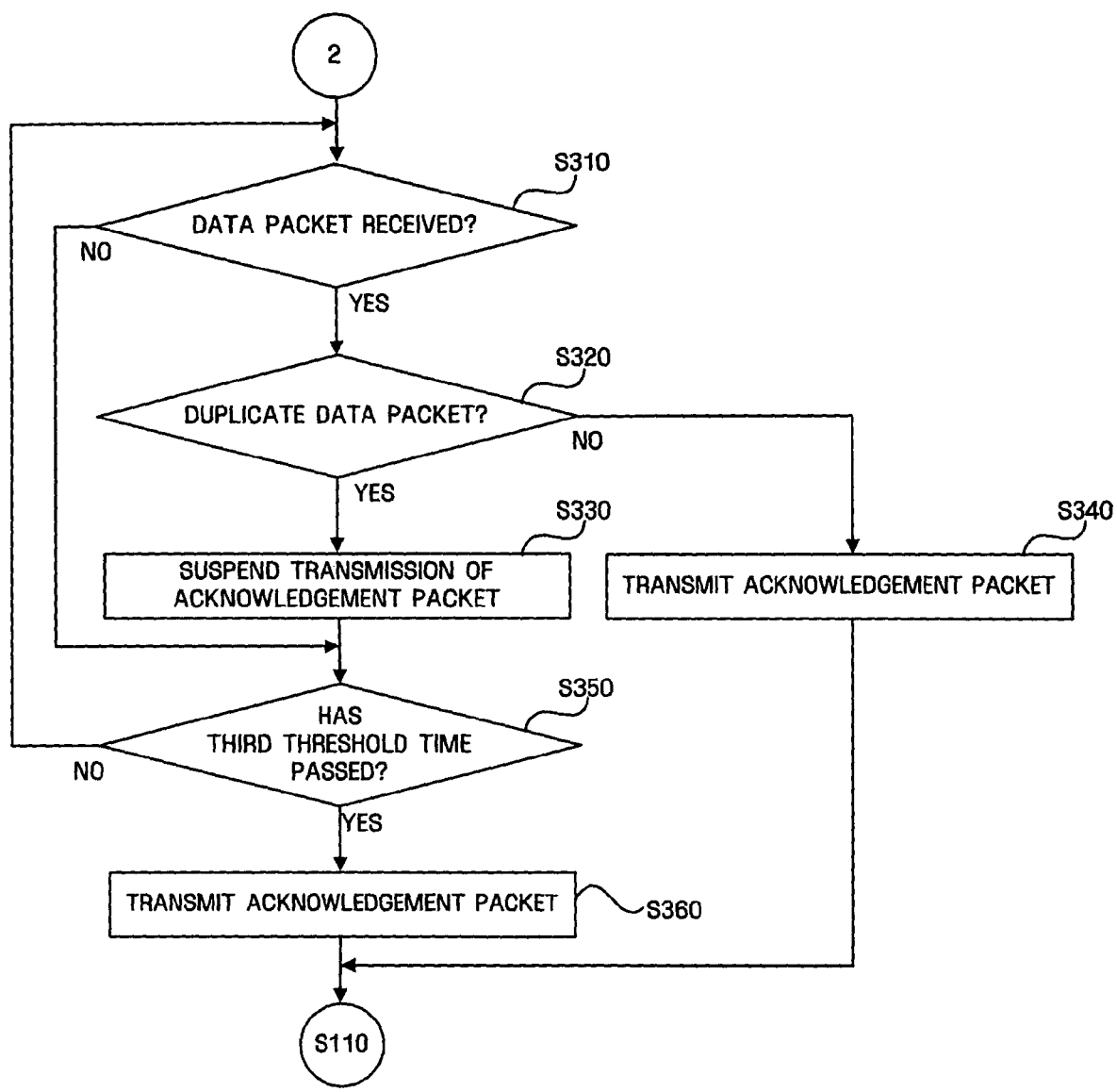
FIG. 7 is a flow chart illustrating a method of preventing spurious retransmission by a transmitting device according to an exemplary embodiment of the present invention.

FIG. 7 is a flow chart illustrating a method of preventing spurious retransmission in the wireless network environment according to another exemplary embodiment of the present invention.

When a data packet is received after transmission of a response packet in operation S225 or transmission of the duplicate acknowledgement packet in operation S255 (S310), the control unit 445 determines whether the received data packet is a duplicate data packet (S320). When the received data packet is a duplicate data packet, the control unit 445 suspends transmission of a acknowledgement packet corresponding to the received data packet (S330). In this case, the acknowledgement packet generating unit 450 may not generate an acknowledgement packet corresponding to the received data packet.

Due to suspension of the acknowledgement packet transmission, the control unit 445 determines whether a third threshold time has passed under the condition that no new data packet was received after transmission of an acknowledgement packet at operation S225 or transmission of a duplicate acknowledgement packet at operation S255 (S330). When the third threshold time has not passed, the control unit 445 continuously suspends transmission of the acknowledgement packet corresponding to the received data packet. In this case, operation S310 to S330 are repeated. Here, the third threshold time refers to a packet round-trip time that can be estimated by the receiving device. Desirably, the third threshold time has the same value as the first threshold time.

However, when the third threshold time has passed under the condition that no new data packet was received after transmission of the acknowledgement packet at operation S225 or the duplicate acknowledgement packet at operation S255, the control unit 445 transmits an acknowledgement packet corresponding to the data packet having the highest sequence number, among the received data packets (S370); this acknowledgement packet is a duplicate acknowledgement packet, serving to prevent generation of a retransmission timeout by the transmitting device. Thereafter, the communication device repeats processes after operation S110.

When a new data packet was received before the third threshold time passed after the acknowledgement packet was transmitted in operation S225 or the duplicate acknowledgement packet in operation S255 (S320), the control unit 445 controls transmission of an acknowledgement packet corresponding to the received data packet (S350). At this time, the acknowledgement packet generating unit 450 generates an acknowledgement packet corresponding to a data packet as directed by the control unit 445, and the packet transmitting unit 455 transmits the generated acknowledgement packet. Thereafter, the communication device repeats processes after operation S110.

Figure 3:
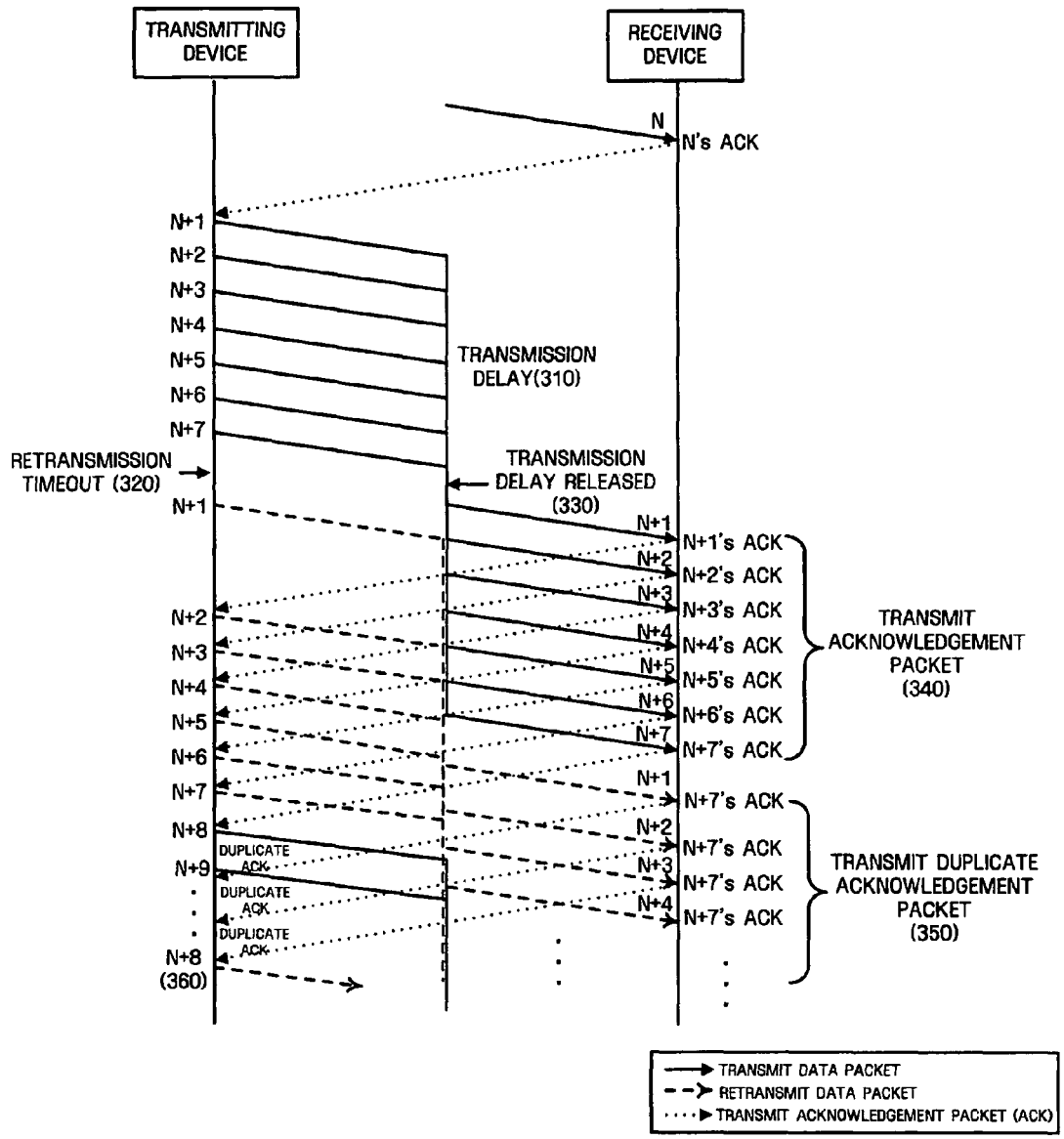
FIG. 3 illustrates transmission of packets between communication devices according to the conventional art.

In an exemplary embodiment of the present invention described with respect to FIGS. 6 and 7, the inter-arrival time measuring unit 430 measures packet inter-arrival times whenever data packets are received by the packet receiving unit 410 at operations S210, S240 and S310. The determination unit 435 compares the measured packet inter-arrival times with the upper limit value of the first threshold time or the second threshold time, and the calculation unit 440 resets the first threshold period or the second threshold period. Accordingly, the communication device according to exemplary embodiments of the present invention conducts operations S120 to S170 of FIG. 3 whenever the data packets are received in operations S210, S240 and S310; steps which are omitted in FIGS. 6 and 7. When a measured packet inter-arrival time exceeds the first threshold time while the communication device is in operation, as illustrated in the flow charts of FIGS. 6 and 7, the communication device returns to operation S180 of FIG. 5 and repeats the operations following operation S180.

A packet transmitting process according to an exemplary embodiment of the present invention will be described with reference to FIGS. 8 to 11. In these figures, "N" to "N+10" refer to the sequence numbers of data packets.

Figure 8:
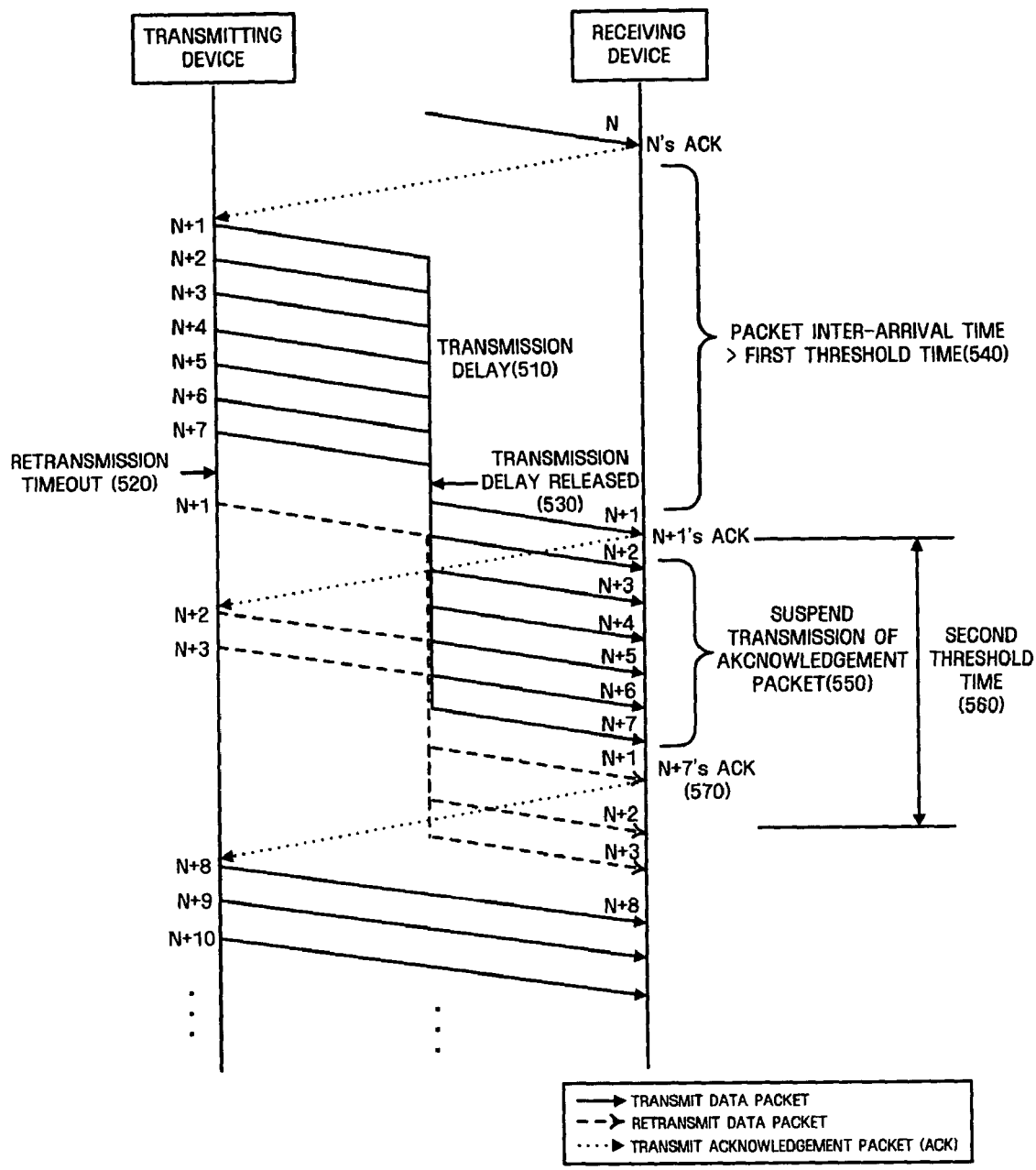
FIG. 8 illustrates transmission of packets between communication devices according to an exemplary embodiment of the present invention.

FIG. 8 illustrates a process of transmitting packets between communication devices according to an exemplary embodiment of the present invention.

As illustrated, the receiving device transmits an acknowledgement packet corresponding to a received data packet.

The transmitting device that received the response packet corresponding to the data packet "N" consecutively transmits data packets "N+1" to "N+7," but the transmitted data packets suffer from transmission delays in the wireless network 510. The delayed data packets may be stored in the queue of the relaying device, which relays packet between the transmitting device and the receiving device.

A retransmission timeout is generated 520 in the transmitting device that has not received a response packet within the predetermined time due to the transmission delay. Once the retransmission timeout is generated, the transmitting device determines that the data packets "N+1" to "N+7" have been lost and attempts retransmission thereof. At this time, the TCP of the transmitting device decreases the CWND size to one TCP segment, and thus, the transmitting device preferentially retransmits the data packet "N+1."

In the meantime, if the transmission delay is released within the predetermined time due to a change in the wireless environment 530, the data packets "N+1" to "N+7" are successfully transmitted to the receiving device. In this case, the retransmission timeout generated by the transmitting device is a spurious timeout.

Whenever a data packet is received, the receiving device measures a packet inter-arrival time. When the packet inter-arrival time of the data packet "N+1" exceeds the first threshold time 540, the receiving device may determine that a transmission delay has been generated in the wireless network.

The receiving device transmits an acknowledgement packet corresponding to the data packet "N+1." At this time, the transmitted acknowledgement packet serves to prevent generation of the second retransmission timeout by the transmitting device. At this time, transmission of the acknowledgement packet corresponds to operation S180 of FIG. 5. Accordingly, the following description of FIG. 8 is an exemplary embodiment of operations S210 to S230 of FIG. 6.

Referring to the description with reference to FIG. 6, when a data packet received before the second threshold time has passed after having transmitted the acknowledgement packet corresponding to the data packet in excess of the first threshold time (S180) is a new data packet, the communication device suspends transmission of an acknowledgement packet corresponding to the received data packet (S220). Accordingly, the receiving device in the embodiment of FIG. 8 suspends transmission of acknowledgement packets to the data packets "N+2" to "N+7" received before the second threshold time 560 has passed after having transmitted an acknowledgement packet corresponding to the data packet "N+1" 550.

Upon receiving the acknowledgement packet corresponding to the data packet "N+1," the transmitting device increases the CWND size twice and transmits the data packets "N+2" and "N+3" simultaneously. At this time, the retransmitted data packets "N+1" to "N+3" are on standby in the queue of the relaying device while the previously transmitted data packets "N+1" to "N+7" are being relayed. For this reason, the retransmitted data packets may also be a little delayed in transmission, as shown.

As described with respect to operations S215 and S225 of FIG. 6, when a duplicate data packet is received before the second threshold time has passed, the communication device transmits an acknowledgement packet corresponding to a data packet having the highest sequence number, among the data packets received to date (S225). In FIG. 8, since the data packet "N+1" was re-received before the second threshold time 560 passed, the receiving device transmits an acknowledgement packet 570 to the data packet "N+7" having the highest sequence number, among the received data packets.

As the transmitting device has received the acknowledgement packet corresponding to the data packet "N+7" before a retransmission timeout is generated, it transmits data packets "N+8, N+9, . . . " following the data packet "N+7."

In this exemplary embodiment, unnecessary retransmission by the transmitting device of the data packets "N+4" to "N+7" can be prevented.

An example where the second threshold time has passed under the condition that no duplicate data packet was received (operations S235 to S255 of FIG. 6) will be described with reference to FIG. 9.

Figure 9:
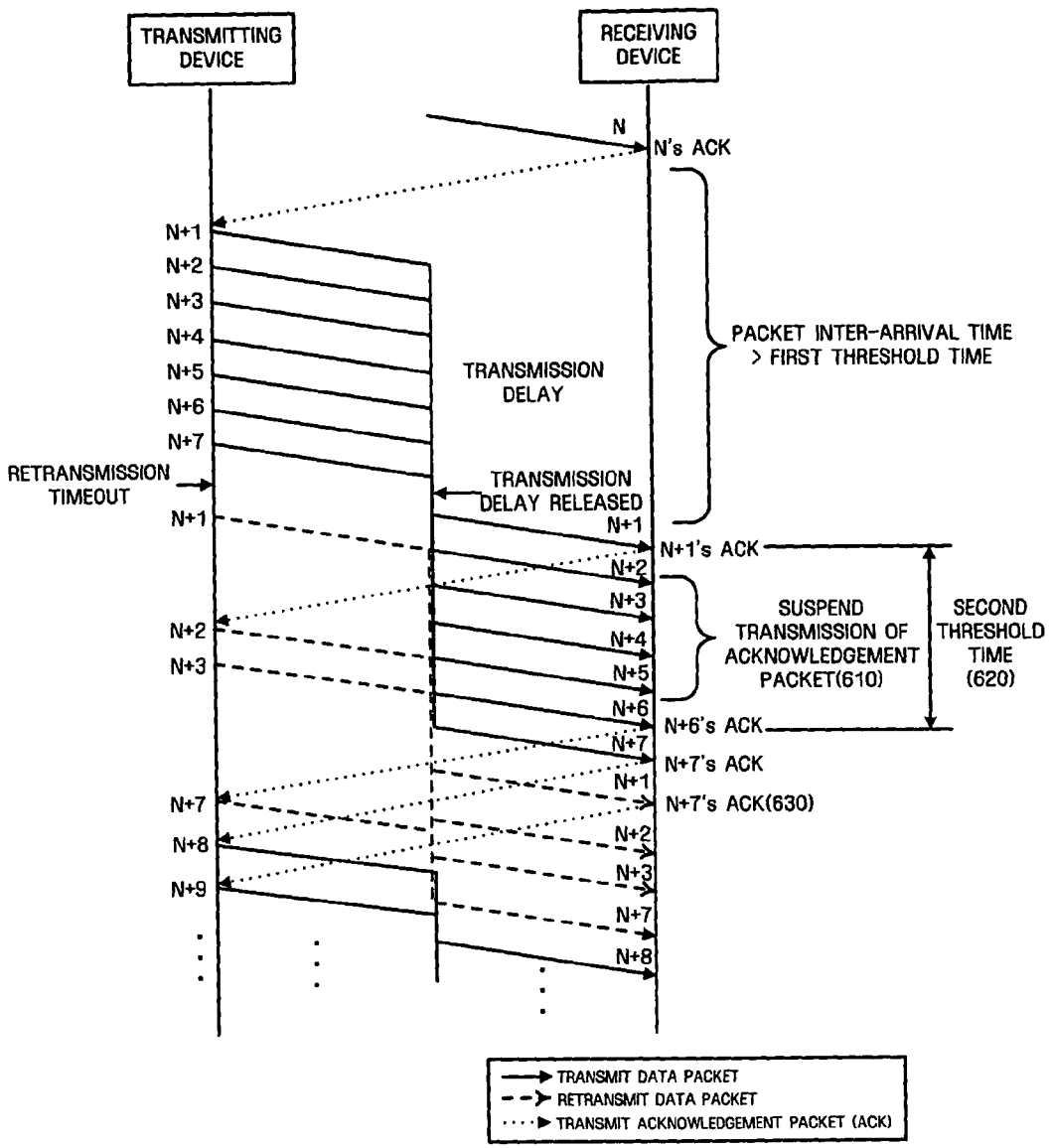
FIG. 9 illustrates transmission of packets between communication devices according to another exemplary embodiment of the present invention.

FIG. 9 illustrates a process of transmitting packets between communication devices according to another exemplary embodiment of the present invention.

Referring to this figure, the receiving device suspends transmission of an acknowledgement packet corresponding to a new data packet received before the second threshold time 620 has passed after having transmitted an acknowledgement packet corresponding to the data packet "N+1" that was received at a packet inter-arrival time in excess of the first threshold time 610. In the case where the second threshold time 620 passes and no duplicate data packet has been received, the receiving device transmits an acknowledgement packet corresponding to the data packet "N+6" having the highest sequence number, among the data packets received before the second threshold time 620 has passed. At this time, transmission of the acknowledgement packet corresponds to operation S235 of FIG. 6.

Since the data packet "N+7" received thereafter is a new data packet, the receiving device transmits an acknowledgement packet corresponding to the data packet "N+7"; transmission of this acknowledgement packet corresponds to operation S250 of FIG. 6.

However, after having received the data packet "N+7," the receiving device receives a data packet "N+1" retransmitted by the transmitting device; that is, a duplicate data packet. Thus, the receiving device transmits a duplicate acknowledgement packet 630; this transmission corresponds to operation S255 of FIG. 6.

Meanwhile, the transmitting device that received an acknowledgement packet corresponding to the data packet "N+6" transmits data packets "N+7", "N+8", and others following data packet "N+6." According to this embodiment, unnecessary retransmission of the data packets "N+4" to "N+6" can be prevented.

The receiving device controls transmission of the acknowledgement packet as described with respect to FIG. 7 after having transmitted an acknowledgement packet 570 and upon receiving a duplicate data packet in FIG. 8 or having transmitted a duplicate acknowledgement packet 630 in FIG. 9. Exemplary embodiments thereof are illustrated in FIGS. 10 and 11.

Figure 10:
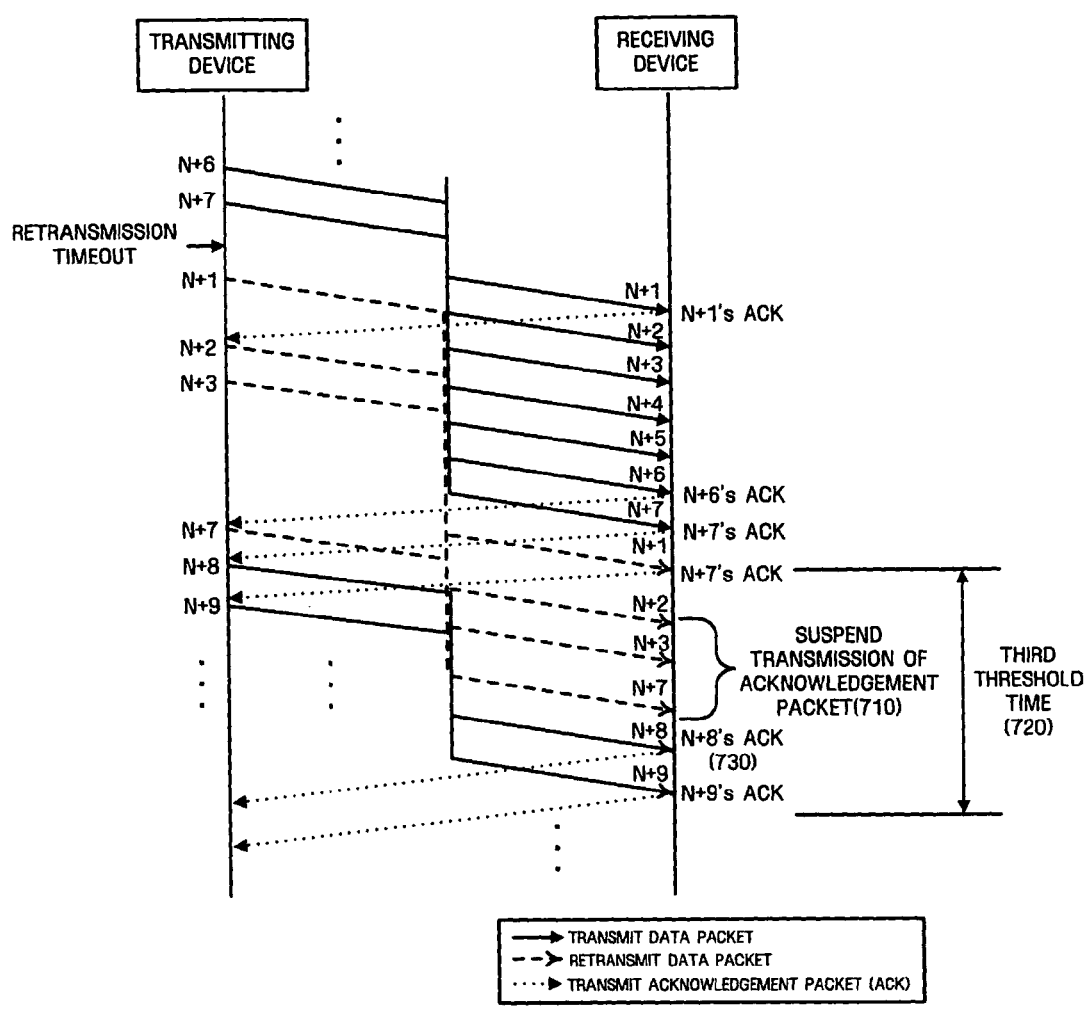
FIG. 10 illustrates transmission of packets between communication devices according to a further exemplary embodiment of the present invention.
Figure 11:
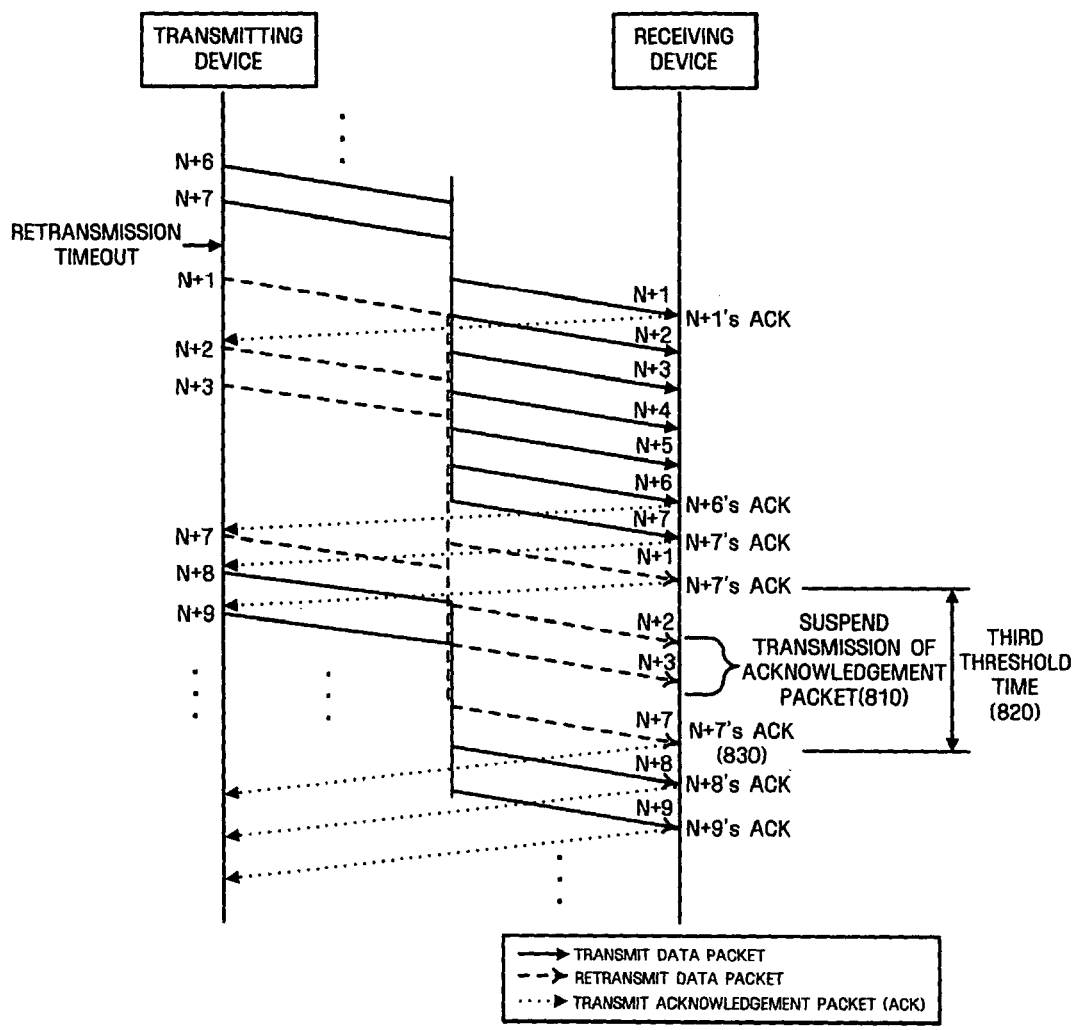
FIG. 11 illustrates transmission of packets between communication devices according to a still further exemplary embodiment of the present invention.

FIG. 10 illustrates a process of transmitting packets between communication devices according to another exemplary embodiment of the present invention.

FIG. 10 specifically depicts processes after the receiving device has received the duplicate response packet 630 of FIG. 9, but processes after the receiving device has transmitted a response packet 570 to a duplicate data packet "N+1" in FIG. 8 can be understood in the same manner.

As described above with reference to FIG. 7, the communication device suspends transmission of an acknowledgement packet corresponding to a data packet received before the third threshold time passes or a new data packet is received after having transmitted an acknowledgement packet in operation S225 or transmitted a duplicate acknowledgement packet in operation S255. Accordingly, the receiving device in FIG. 10 suspends transmission of acknowledgement packets although duplicate data packets "N+2, N+3 and N+7", received after having transmitted an acknowledgement packet corresponding to a duplicate data packet "N+1", have been received 710. When a new data packet "N+8" is received before the third threshold time 720 has passed, the receiving device transmits an acknowledgement packet 730 to the new data packet. At this time, transmission of the acknowledgement packet corresponds to operation S340 of FIG. 7.

Thereafter, the receiving device transmits an acknowledgement packet corresponding to the transmitted data packet. In this exemplary embodiment, since generation of a duplicate acknowledgement packet is suppressed, the transmitting device's generation of a spurious retransmission can be prevented.

An example of when the third threshold time has passed before a new data packet is received is illustrated in FIG. 11.

In this figure, the third threshold time 820 passes before a new data packet "N+8" is received. The receiving device in FIG. 11 suspends transmission of an acknowledgment packet although duplicate packets "N+2, N+3", received after having transmitted an acknowledgement packet corresponding to a duplicate packet "N+1", have been received 810. Accordingly, the receiving device transmits an acknowledgement packet 830 to the data packet "N+7" having the highest sequence number, among the data packets received before the third threshold time has passed. This is a duplicate acknowledgement packet 830, and transmission of the acknowledgement packet at this time corresponds to operation S360 of FIG. 7.

Thereafter, the receiving device transmits an acknowledgement packet corresponding to the received data packet. In this exemplary embodiment, generation of a spurious retransmission by the transmitting device is prevented by suppressing generation of the duplicate acknowledgement packets.

As described above, a method for prevention of unnecessary retransmission due to transmission delays in the wireless network environment and a communication device using the same produce at least one of the following effects:

First, unnecessary retransmissions due to delays in transmission of data packets are reduced in the wireless network environment.

Second, as the unnecessary transmissions are reduced, spurious retransmissions are accordingly prevented.

Third, as the spurious retransmissions are prevented, a phenomenon where the transmission rate is unnecessarily reduced is prevented.

It will be understood by those of ordinary skill in the art that various replacements, modifications and changes in form and details may be made therein without departing from the spirit and scope of the present invention as defined by the following claims. Therefore, it is to be appreciated that the above described embodiments are for purposes of illustration only and are not to be construed as a limitation of the invention.

What is claimed is:

1. A method for reducing unnecessary retransmissions due to transmission delays in a wireless network environment implemented by a communication device, the method comprising:

measuring a packet inter-arrival time with respect to a first received data packet by the communication device;

transmitting an acknowledgement packet corresponding to the first received data packet by the communication device if the measured packet inter-arrival time of the first received data packet exceeds a first threshold time;

determining whether a second received data packet by the communication device is a new data packet or a duplicate data packet if the second received data packet is received during a second threshold time after the transmission of the acknowledgement packet corresponding to the first received data packet, and the new data packet is a data packet that has not previously been received and the duplicate data packet is a data packet that has previously been received, transmitting, after the second threshold has passed, an acknowledgement packet corresponding to a data packet having a highest sequence number, among data packets received before the second threshold time has passed if the second threshold time has passed and the second received data packet is the new data packet, and transmitting, at time of receipt of the second received data packet, an acknowledgement packet corresponding to a data packet having a highest sequence number, among the data packets received before the duplicate data packet is received if the second received data packet received is the duplicate data packet within the second threshold time, wherein the packet inter-arrival time is a time interval between an arrival time of a previously received data packet and an arrival time of a currently received data packet, wherein if a data packet received after having transmitted the acknowledgement packet corresponding to the data packet having the highest sequence number is another duplicate data packet, transmission of an acknowledgement packet corresponding to the other duplicate data packet is suspended.

2. The method of claim 1, wherein the first threshold time refers to a value obtained by estimating a packet round-trip time of a data packet transmitted by a transmitting device.

3. The method of claim 2, wherein the first threshold time is $T_L + V_L$ where $T_L$ is a mean value of packet inter-arrival times included in a first time zone, among the measured packet inter-arrival times, and $V_L$ is a deviation of the mean value $T_L$.

4. The method of claim 3, wherein the first time zone is $(T_S+V_S, T_L+V_L)$, where $T_S$ is a mean value of packet inter-arrival times included in a second time zone among the measured packet inter-arrival times, and $V_S$ is a deviation of the mean value $T_S$.

5. The method of claim 4, wherein the initial value of the mean value $T_L$ is a measured packet inter-arrival time to a second data packet transmitted from the transmitting device, the initial value of the variation $V_L$ is a real number times the initial value of the mean value $T_L$, where the real number has a positive value less than 1.

6. The method of claim 4, wherein the second time zone is: $(0, T_S+V_S)$.

7. The method of claim 6, wherein an initial value of the mean value of $T_S$ is a measured packet inter-arrival time relative to a third data packet transmitted by the transmitting device, and an initial value of the variation $V_S$ is a real number times the initial value of the mean value $T_S$, where the real number has a positive value less than 1.

8. A method for reducing unnecessary retransmissions due to transmission delays in a wireless network environment implemented by a communication device, the method comprising:

measuring a packet inter-arrival time with respect to a first received data packet by the communication device;

transmitting an acknowledgement packet corresponding to the first received data packet by the communication device if the measured packet inter-arrival time of the first received data packet exceeds a first threshold time; and suspending transmission of an acknowledgement packet corresponding to a second received data packet by the communication device if the second received data packet is received during a second threshold time after the transmission of the acknowledgement packet corresponding to the first received data packet, and the second received data packet is a data packet that has not previously been received, wherein the packet inter-arrival time is a time interval between an arrival time of a previously received data packet and an arrival time of a currently received data packet, and the second threshold time has a same value as the first threshold time, wherein if a data packet received after having transmitted the acknowledgement packet corresponding to the data packet having the highest sequence number is another duplicate data packet, transmission of an acknowledgement packet corresponding to the other duplicate data packet is suspended, and wherein if a third threshold time has passed since having transmitted the acknowledgement packet corresponding to the data packet having the highest sequence number an acknowledgement packet corresponding to the data packet having the highest sequence number is transmitted, among the data packets received before the third threshold time has passed.

9. The method of claim 8, wherein the third threshold time has the same value as the first threshold time.

10. A communication device comprising:

an inter-arrival time measuring unit which measures a packet inter-arrival time of a first received data packet;

a calculation unit which calculates a first threshold time using the packet inter-arrival time measured by the inter-arrival time measuring unit;

a determination unit which compares the packet inter-arrival time measured by the inter-arrival time measuring unit with the first threshold time calculated by the calculation unit; and a control unit which transmits an acknowledgement packet corresponding to the first received data packet if the packet inter-arrival time of the first received data packet exceeds the first threshold time and determines whether a second received data packet by the communication device is a new data packet or a duplicate data packet if the second received data packet is received during a second threshold time after the transmission of the acknowledgement packet corresponding to the first received data packet, and the new data packet is a data packet that has not previously been received and the duplicate data packet is a data packet that has previously been received, wherein the control unit transmits an acknowledgement packet corresponding to a data packet having a highest sequence number, among data packets received before the second threshold time has passed if the second threshold time has passed and the second received data packet is the new data packet, and transmits an acknowledgement packet corresponding to a data packet having a highest sequence number immediately, among the data packets received before the duplicate data packet is received if the second received data packet received is the duplicate data packet within the second threshold time, and wherein the packet inter-arrival time is a time interval between an arrival time of a previously received data packet and an arrival time of a currently received data packet, wherein if a data packet received after having transmitted the acknowledgement packet corresponding to the data packet having the highest sequence number is another duplicate data packet, the control unit suspends transmission of an acknowledgement packet corresponding to the other duplicate data packet.

11. The device of claim 10, wherein the first threshold time is obtained by estimating a packet round-trip time of a data packet transmitted by the transmitting device.

12. The device of claim 11, wherein the first threshold time is $T_L + V_L$, where $T_L$ is a mean value of packet inter-arrival times included in a first time zone, among the measured packet inter-arrival times, and $V_L$ is the deviation of the mean value $T_L$.

13. The device of claim 12, wherein the first time zone is $(T_S + V_S, T_L + V_L)$, where $T_S$ is a mean value of packet inter-arrival times included in a second time zone among the measured packet inter-arrival times, and $V_S$ is a deviation of the mean value $T_S$.

14. The device of claim 13, wherein an initial value of the mean value $T_L$ is a measured packet inter-arrival time relative to a second data packet transmitted from the transmitting device, and an initial value of the variation $V_L$, is a real number times the initial value of the mean value $T_L$, where the real number has a positive value less than 1.

15. The device of claim 13, wherein the second time zone is: $(0, T_S + V_S)$.

16. The device of claim 15, wherein an initial value of the mean value of TS is a measured packet inter-arrival time relative to a third data packet transmitted by the transmitting device, and the initial value of the variation VS is a real number times the initial value of the mean value TS, where the real number has a positive value less than 1.

17. A communication device comprising:
  an inter-arrival time measuring unit which measures a packet inter-arrival time of a first received data packet;
  a calculation unit which calculates a first threshold time using the packet inter-arrival time measured by the inter-arrival time measuring unit;
  a determination unit which compares the packet inter-arrival time measured by the inter-arrival time measuring unit with the first threshold time calculated by the calculation unit; and
  a control unit which controls transmission of an acknowledgement packet corresponding to the first received data packet if the determination unit determines that the packet inter-arrival time exceeds a first threshold time, and suspends transmission of an acknowledgement packet corresponding to a second received data packet if the second received data packet is received during a second threshold time after having transmitted the acknowledgement packet corresponding to the first received data packet, and the second received data packet has not been previously received,
  wherein the packet inter-arrival time is a time interval between an arrival time of a previously received data packet and an arrival time of a currently received data packet, and the second threshold time has a same value as the first threshold time,
  wherein if a data packet received after having transmitted the acknowledgement packet corresponding to the data packet having the highest sequence number is another duplicate data packet, the control unit suspends transmission of an acknowledgement packet corresponding to the other duplicate data packet, and
  wherein if a third threshold time has passed since having transmitted the acknowledgement packet corresponding to the data packet having the highest sequence number, the control unit transmits an acknowledgement packet corresponding to the data packet having the highest sequence number, among the data packets received before the third threshold time has passed.

18. The device of claim 17, wherein the third threshold time has the same value as the first threshold time.

* * * * *